United States Patent
Enzenhofer et al.

(10) Patent No.: US 11,413,554 B2
(45) Date of Patent: Aug. 16, 2022

(54) ASSEMBLY AND METHOD FOR TREATING RAW WATER

(71) Applicants: Matthias Enzenhofer, Heilbronn (DE); Siegfried Gruber, Rheda-Wiedenbruck (DE)

(72) Inventors: Matthias Enzenhofer, Heilbronn (DE); Siegfried Gruber, Rheda-Wiedenbruck (DE)

( * ) Notice: Subject to any disclaimer, the term of this patent is extended or adjusted under 35 U.S.C. 154(b) by 887 days.

(21) Appl. No.: 15/118,130

(22) PCT Filed: Feb. 9, 2015

(86) PCT No.: PCT/EP2015/052615
§ 371 (c)(1),
(2) Date: Aug. 11, 2016

(87) PCT Pub. No.: WO2015/121191
PCT Pub. Date: Aug. 20, 2015

(65) Prior Publication Data
US 2017/0036140 A1    Feb. 9, 2017

(30) Foreign Application Priority Data
Feb. 11, 2014    (EP) .................................... 14154708

(51) Int. Cl.
*B01D 5/00*        (2006.01)
*B01D 1/16*        (2006.01)
(Continued)

(52) U.S. Cl.
CPC ........... *B01D 5/006* (2013.01); *B01D 1/0035* (2013.01); *B01D 1/16* (2013.01); *B01D 1/28* (2013.01);
(Continued)

(58) Field of Classification Search
CPC .... B01D 3/007; B01D 5/0039; B01D 1/0035; B01D 1/16; B01D 1/28; B01D 5/0015;
(Continued)

(56) References Cited

U.S. PATENT DOCUMENTS

| 3,345,272 A | 10/1967 | Collins |
| 3,440,147 A * | 4/1969 | Rannenberg .............. C02F 1/16 203/11 |

(Continued)

FOREIGN PATENT DOCUMENTS

| CN | 1243449 | 2/2000 |
| CN | 1271333 | 10/2000 |

(Continued)

OTHER PUBLICATIONS

Search Report.
(Continued)

*Primary Examiner* — Dirk R Bass
(74) *Attorney, Agent, or Firm* — Alix, Yale & Ristas, LLP

(57) ABSTRACT

An assembly and a method for treating raw water wherein the raw water is heated on the heating side of a heat pump and at least partially evaporated into an air stream. At least part of the raw water evaporated into the air stream is separated in a suitable device. In addition, the heat pump is provided with heat on the cooling side by means of heated raw water that has not been evaporated into the air stream, and the heat pump has a thermal coupling in a coldest section of its cooling side, in order to provide cooling for external applications.

20 Claims, 2 Drawing Sheets

(51) Int. Cl.
*C02F 1/04* (2006.01)
*B01D 1/28* (2006.01)
*C02F 1/14* (2006.01)
*C02F 1/12* (2006.01)
*B01D 1/00* (2006.01)
*B01D 3/00* (2006.01)
*C02F 1/10* (2006.01)
*C02F 103/08* (2006.01)

(52) U.S. Cl.
CPC ........... *B01D 3/007* (2013.01); *B01D 5/0015* (2013.01); *C02F 1/04* (2013.01); *C02F 1/041* (2013.01); *C02F 1/10* (2013.01); *C02F 1/12* (2013.01); *C02F 1/14* (2013.01); *C02F 2103/08* (2013.01); *C02F 2303/10* (2013.01); *Y02A 20/124* (2018.01); *Y02A 20/212* (2018.01); *Y02B 30/52* (2013.01); *Y02W 10/30* (2015.05)

(58) Field of Classification Search
CPC . B01D 5/006; Y02B 30/52; C02F 1/04; C02F 1/041; C02F 1/10; C02F 1/12; C02F 1/14; C02F 2103/08; C02F 2303/10; Y02A 20/124; Y02A 20/212; Y02W 10/30
See application file for complete search history.

(56) References Cited

U.S. PATENT DOCUMENTS

| | | | |
|---|---|---|---|
| 2006/0124440 A1* | 6/2006 | Pautz | C02F 1/12 203/10 |
| 2011/0226605 A1* | 9/2011 | Thiers | B01D 1/305 203/10 |
| 2011/0284443 A1* | 11/2011 | Chen | B01D 5/0009 210/180 |
| 2012/0073320 A1* | 3/2012 | Seoane | B01D 5/0006 62/291 |
| 2012/0205236 A1 | 8/2012 | Govindan | |
| 2012/0292176 A1* | 11/2012 | Machhammmer | B01D 1/14 203/10 |
| 2015/0251924 A1* | 9/2015 | Li | C02F 1/16 203/10 |

FOREIGN PATENT DOCUMENTS

| | | |
|---|---|---|
| CN | 102557169 | 7/2012 |
| DE | 2553464 | 6/1977 |
| DE | 102009031246 | 8/2010 |
| DE | 102007014807 | 8/2012 |

OTHER PUBLICATIONS

Abstract of CN1243449.
Abstract of CN1271333.
Abstract of CN102557169.

* cited by examiner

ASSEMBLY AND METHOD FOR TREATING RAW WATER

BACKGROUND

The invention relates to an assembly and a method for treating a raw water.

Obtaining treated water from raw water, in particular seawater, is known, for example, from DE102007014807B4. Therein, a method is proposed in which raw water is vaporized and an air volume is saturated with the vaporized raw water. Subsequently, the raw water-containing air volume is conducted past an assembly of adsorption tubes equipped with air-permeable walls. In this case the water-containing air volume also penetrates into the lumen of the adsorption tubes. A part of the water entrained by the air volume is separated out externally and internally on the adsorption tubes and also within the permeable tube material. Using this method, treated water can be obtained, for example from seawater, which treated water has a purity such that it can be utilized at least in agriculture.

The abovementioned method can also be used to provide service water for, for example, hotels, industrial operations or other facilities in the vicinity of a raw water source such as, for example, a sea coast. In addition to service water, hotels, for example, as do also industrial operations or other facilities, frequency require cooling, in order, for example, to air-condition rooms or to cool plants in the respective facilities. Therefore, a method and a device for implementing the method, which can not only treat a raw water, but also provide cooling for external applications is proposed. The method and also the device are in this case intended to be designed to be as energy-efficient as possible.

SUMMARY

An assembly for treating a raw water has a heat pump which is designed to heat the raw water on the heating side; a vaporizer is designed to vaporize the heated raw water partly into an air stream; and a device is connected downstream of the vaporizer and is suitable for separating out at least in part the raw water present in the air stream. In this case the heat pump is designed to be supplied with heat on the cooling side via heated raw water that has not been vaporized into the air stream; and the heat pump, in a coldest subregion of the cooling side, has a thermal coupling which is suitable for providing cooling for external applications.

Using the proposed assembly, a raw water can be vaporized into an air stream and the raw water present in the air stream can be at least in part separated out in a downstream device, as a result of which a prepared water can be obtained that is usable at least as service water. In addition, the raw water is used to operate a heat pump with the lowest possible energy input, which heat pump in turn provides cooling for external applications on the cooling side thereof.

In a preferred embodiment of the assembly, a compressing means is connected upstream of the device that is suitable for separating out the raw water present in the air stream, which compressing means is suitable for compressing the air stream. The air stream that is compressed by the compressing means can be expanded again in the device which is suitable for separating out the raw water present in the air stream, in such a manner that the pressure in the air stream is (abruptly) lowered, as a result of which the separation out of water from the air stream is promoted.

In an advantageous embodiment, the device that is suitable for separating out the raw water present in the air stream comprises a carrier assembly having a number of carriers. In a first alternative, the carriers can be porously knitted flexible plastic tubings that have been subjected to a heat treatment for mechanical stabilization. In a second alternative, the carriers can be any type of porous flexible tubings that have a large surface area in the interior of the tubings, in particular flexible tubings made of artificial fibers or metal. In a third alternative, the carriers can also be open-pore plates that contain in particular artificial fibers, rock wool or glass wool.

Advantageously, the device that is suitable for separating out the raw water present in the air stream is cooled by the incoming raw water before the heating thereof. As a result, the air stream flowing into the device is cooled, whereby the water separation out of the incoming air stream is promoted. Also, the heat pump can be thermally coupled to the device in order to deliver the heat introduced into the device by the air stream to the heat pump, as a result of which said heat pump can be operated with a lower energy input.

In a further embodiment, the assembly for treating a raw water additionally comprises a solar and/or geothermal device that is designed to heat the raw water further. Owing to the solar and/or geothermal device, the raw water incoming into the vaporizer can be further heated, and thereby more raw water can be vaporized into the air stream. Likewise, the assembly can comprise a further solar and/or geothermal device that is thermally coupled to the cooling side of the heat pump, in order to provide a further regenerative heat source for the heat pump.

According to a second aspect of the invention, the object hereinbefore is achieved by a method for treating a raw water which has the following steps: heating the raw water; partial vaporization of the heated raw water into an air stream; and at least partial separating out of the raw water vaporized into the air stream. In this case the raw water is heated by the heating side of a heat pump and the heat pump is supplied with heat on the cooling side by heated raw water that is not vaporized into the air stream. The heat pump has a thermal coupling in a coldest subregion of the cooling side in order to provide cooling for external applications.

Preferably, the method in this case additionally comprises a step of compressing the air stream before separating out the raw water vaporized into the air stream. Particularly preferably, the heated raw water is vaporized into the air stream up to saturation of said air stream.

Using the method, a raw water can be treated until said raw water has at least service water quality, in order, for example, to be used as service water in hotels or else in industrial operations. In addition, using the method, cooling can be provided for external applications, which cooling can be used, for example, by hotels supplied with raw water for cooling the rooms. The treated raw water and the cooling can be made available to, in particular, the same customer, but also to different customers. The method can be designed in this case in an efficient manner, in particular using the assembly.

BRIEF DESCRIPTION OF THE DRAWINGS

Hereinafter, the invention will be explained in more detail with reference to the accompanying drawings. In this case the same reference signs denote the same or identically-acting elements.

In the drawings.

DETAILED DESCRIPTION

Raw water is fed from a raw water source Q, which can be, for example, the sea, to the assembly of FIG. 1. The incoming raw water can have, for example, a temperature of approximately 15-20° C., if it is withdrawn from the sea. The raw water can initially be passed through a device 3 that is suitable for separating out at least in part raw water present in an air stream in order then to be heated on the heating side W of a heat pump 1. The raw water that is now heated is subsequently fed to a vaporizer 2 that is designed to vaporize the heated raw water partially into an air stream L. Between the heating side W of the heat pump 1 and the vaporizer 2 in this case, in a further development of the assembly, a solar and/or geothermal device 6 can be connected which is designed to heat further the raw water that is already heated on the heating side W.

The heated raw water is vaporized in the vaporizer 2 into the air stream L. The raw water can in this case be introduced into the vaporizer 2 via, for example, a shower head or spray head, or else via nozzles, where the raw water droplets, on account of their increased surface area in comparison with a compact jet, can be vaporized better into the air stream L. The vaporization is promoted by heating the raw water to a temperature in the range from 60 to 80° C. Particularly preferably, raw water is vaporized into the air stream L up to saturation of said air stream.

The air stream L' that is now loaded with raw water is subsequently fed to the device 3 that is suitable for separating out at least in part the raw water present in the air stream L'. In this case, the air stream L' can also first be compressed by a compressing means 5 that can be, for example, a fan, and then introduced into the device 3.

The device 3 has in the interior a carrier assembly having a number of carriers. The carriers develop adhesion effects towards the raw water present in the air stream L', which adhesion effects facilitate the separation out of the water on the carriers. The surface of the carriers acts here as a condensation nucleus that permits the formation of relatively large water droplets by the raw water present in the air stream L'. The raw water that is separated out on the carriers can then be collected in the device 3 and from there fed to a point of need or collecting point S. The point of need or collecting point S can in this case be, for example, a service water system of a hotel installation or else of an industrial operation. Also, the collecting point S can be, for example, a tank, in order to collect the water that is separated out.

As carriers, firstly, for example, profiles, flexible tubings or tubes can be used, in particular knitted flexible plastic tubings which preferably consist of thermoplastics such as polyester, polyamide, polyethylene or polypropylene. In this case, in particular polyester is suitable for the knitted flexible plastic tubings. The knitted flexible plastic tubings can be formed from one or more filaments, preferably from a plurality of filaments. The knitted flexible plastic tubings are made mechanically more stable by a thermal treatment such as, for instance, partial melting together or sintering together of the elements, optionally with shrinkage. The flexible plastic tubings thus treated are more dimensionally stable and display a certain self-stiffness and bending elasticity. However, they remain porous in this case, in such a manner that they have a surface area increased in comparison with smooth flexible plastic tubings, in order in this manner to promote the formation of water droplets by raw water present in the air stream L'.

Suitable carriers in this case, however, are not merely the abovementioned knitted flexible plastic tubings, but in principle any type of porous flexible tubing made of plastic or else artificial fibers or metals. A critical factor for the efficiency of droplet formation and thus of water separation out of the air, is the available surface area, in particular also in the interior and/or in the walls of the carriers.

As is shown in FIG. 2, the carriers can also be designed as open-pore plates 8, which, in particular, again, can contain artificial fibers or else rock wool or glass wool. In this case, a plurality of open-pore plates 8 can be stacked one above the other and have outlet channels 9 therebetween. The plates can receive inflow from one side with the air stream L' loaded with raw water, as a result of which raw water which is present in the air stream L' can be taken up by the plates 8 and can be fed via the collecting and outlet channels 9 to a collecting line 11. Via the collecting line 11, the pure water can then be fed to the collecting point or point of need S. After passage through the plates 8, the air stream L" is still partially loaded with raw water. The air stream L" can then firstly be delivered to the environment or else made available for external applications which utilize heated and water-enriched air streams. A use for the air conditioning of rooms would also be conceivable. Alternatively, the air stream L" can be fed in whole or in part as air stream L to the vaporizer 2. In this manner, in particular a closed circuit of the air stream can be generated and thereby contamination of the device with foreign particles from air drawn in by suction can be avoided.

The carrier assembly can in addition comprise cooling batteries 10 which pass through the plates 8 and are fed with the incoming raw water in order to cool the carrier assembly in the device 3. By cooling the plates 8, the air stream L' is also cooled, as a result of which the water separation out of the air stream is favored. As a side effect, the incoming raw water in the cooling batteries 10 can already be preheated by the air stream L' before it is heated on the heating side W of the heat pump 1. In a further embodiment of the invention, a part of the incoming raw water is conducted through the cooling battery 10 in order to cool the plates 8, and another part of the incoming raw water is conducted via the device 3 in order to cool additionally the entire device 3. As mentioned hereinbefore, the incoming raw water can thereby be preheated before the heating on the heating side W of the heat pump 1 and at the same time the water separation in the device 3 can be improved by cooling thereof.

The pressure in the device 3 can be controlled by a pressure control valve 12 that is connected downstream of the device 3. In this case it is advantageous in particular to compress the air stream L' upstream of the device 3 by a compressing means 5 and to ensure via control of the pressure control valve 12 and a throttle 12 that is connected upstream of the device 3 that the air stream L' incoming into the device 3 is expanded as abruptly as possible on entry into the device 3. The separation out of water from the air stream L' can be favored by the abrupt expansion of the air stream.

As is shown in FIG. 1, that part of the heated raw water that is not vaporized into the air stream L is conducted to the cooling side K of the heat pump 1 in order to utilize the heated raw water as heat source for the heat pump 1. The raw water reaches the cooling side K of the heat pump in this case having a temperature from about 50 to 60° C. After as much heat as possible has been withdrawn from the heated raw water, it can be recirculated to the raw water source Q which, inter alia, can be the sea.

The heat delivered by the raw water on the cooling side K of the heat pump 1 is utilized to heat the cooling medium of the heat pump 1 which, for example, can be $CO_2$. Preferably, the heat pump 1 is operated with a maximum temperature of 80° C. on the heating side W and a minimum temperature of −50° C. on the cooling side K, with a compressor 13 therebetween.

Figure 1:
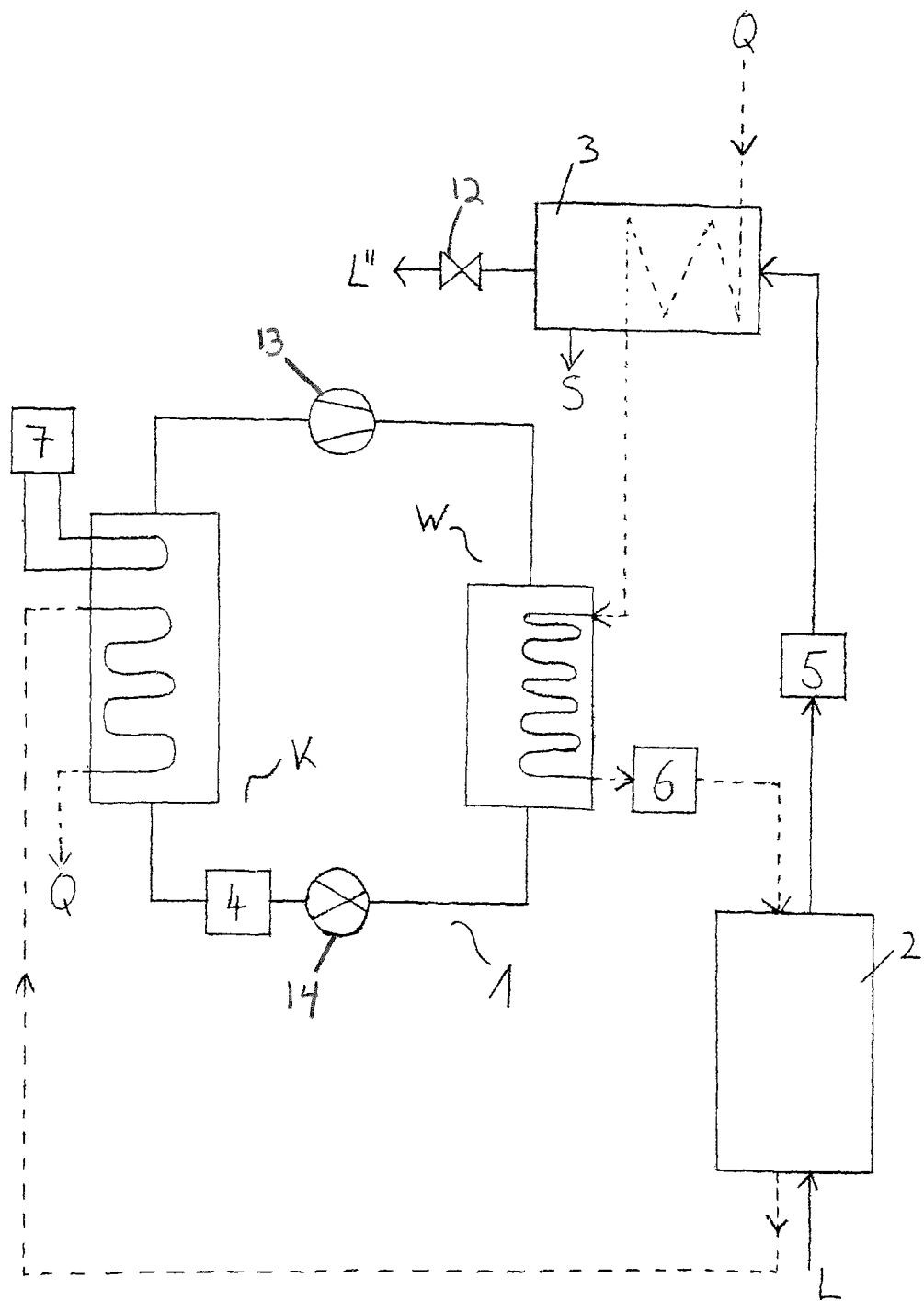
FIG. 1 shows a schematic depiction of the assembly for treating a raw water.
Figure 2:
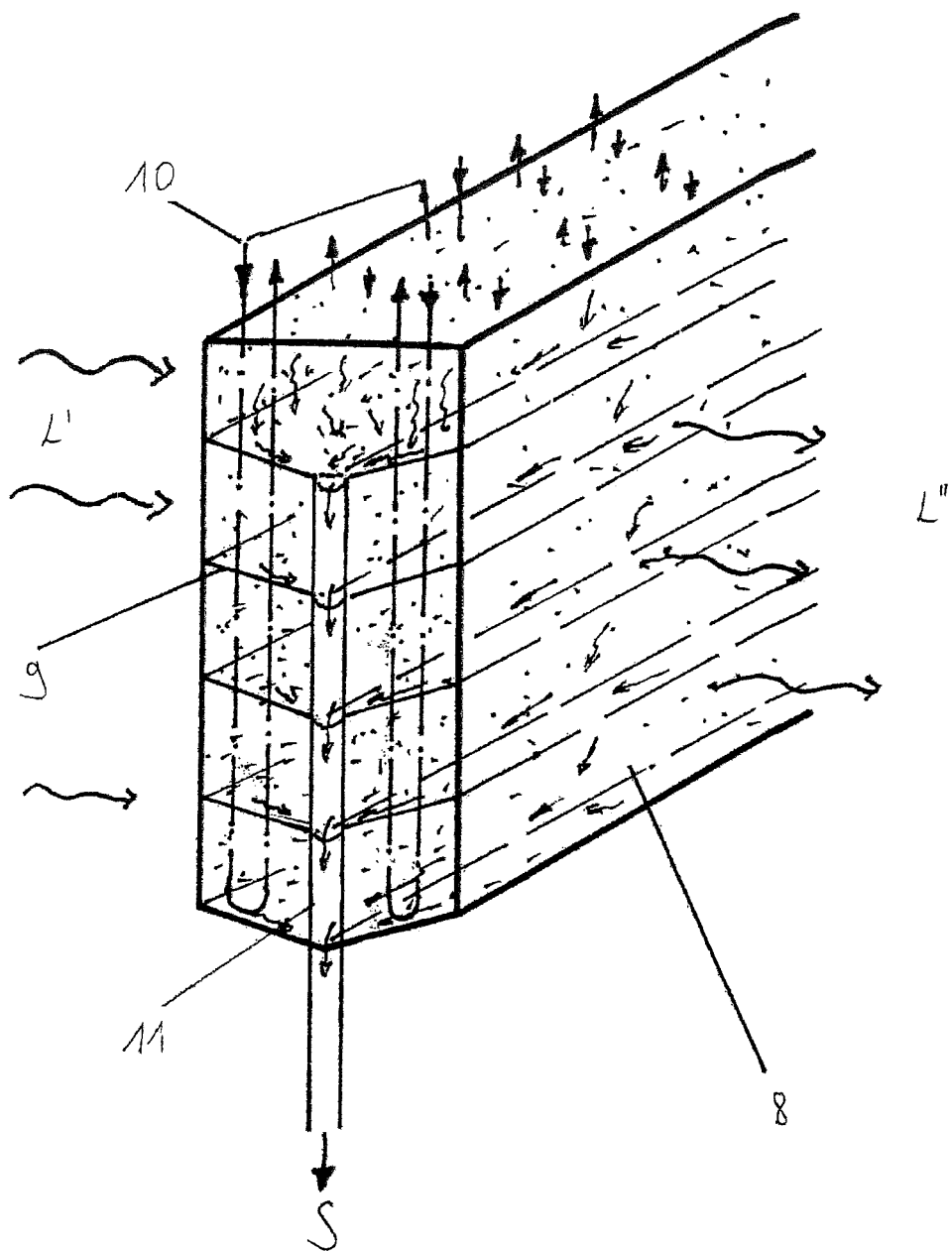
FIG. 2 shows a schematic partial view of a carrier assembly of a device that is suitable for separating out raw water present in an air stream.

With the assembly shown in FIG. 1, incoming raw water can be heated, using small amounts of external energy via the heat pump 1, in order subsequently to be vaporized by the vaporizer 2 and to be separated out in the device 3, in such a manner that service water can be generated from the raw water which can be, for example, seawater.

The heat pump 1, on the cooling side K, in a coldest subregion which is usually in the immediate vicinity of the throttle 14 on the cooling side K, has a thermal coupling 4. Cooling can be provided for external applications via the thermal coupling 4. The thermal coupling 4 can, for example for the abovedescribed $CO_2$ heat pump with operating temperatures of up to +80° C. on the heating side and −50° C. on the cooling side, provide a constant temperature of −30° C., which in turn can be used for cooling by external applications. It is conceivable, for example, by the thermal coupling 4 to provide a "cold source" for industrial operations or else for room air conditioning systems of buildings, and in particular hotel facilities.

The thermal coupling 4 also permits by implication a heat introduction on the cooling side K of the heat pump 1 from heat already present from an external application. Therefore, the heat pump 1 can be operated using relatively small amounts of external energy. In addition, the cooling side K of the heat pump 1 can be thermally coupled to a solar and/or geothermal device 7 in order to obtain further heat input on the cooling side K. Via the device 7, available ambient energy can be utilized inexpensively and with technically manageable complexity for operating the heat pump 1.

Furthermore, the warm air stream L" which exits from the device 3 can likewise be utilized as heat input on the cooling side K of the heat pump 1. Likewise, a thermal coupling between the device 3 and the cooling side K of the heat pump 1 can be provided in order to utilize heat introduced by the hot air stream L' into the device 3 as heat input on the cooling side K of the heat pump 1.

By the efficient utilization of the heat located in the assembly on the cooling side K of the heat pump 1, the efficiency of the heat pump 1 can be greatly increased, in that the usage of external energy for the heat pump 1 is reduced to a minimum. Using the assembly according to the invention, it is possible, in an efficient manner, to treat a raw water at least to service water quality and at the same time provide cooling for an external application.

LIST OF REFERENCE SIGNS

1 Heat pump
2 Vaporizer
3 Device that is suitable for separating out raw water present in an air stream
4 Thermal coupling
5 Compressing means
6 Solar and/or geothermal device
7 Solar and/or geothermal device
8 Open-pore plate
9 Collecting and outlet channel
10 Cooling battery
11 Collecting line
L Air stream
L' Air stream loaded with raw water
L" Air stream after raw water separation
Q Raw water source
S Point of need or collecting point

The invention claimed is:

1. A raw water treatment assembly comprising:
a $CO_2$ heat pump having a heating side, a cooling side, a compressor and a throttle, said $CO_2$ heat pump configured to heat the raw water on the heating side, wherein a cooling medium of the $CO_2$ heat pump comprises $CO_2$ refrigerant;
a vaporizer configured to vaporize the raw water partly into an air stream within the vaporizer, wherein the $CO_2$ heat pump is configured to heat the raw water before entering the vaporizer; and
a separator connected to the vaporizer with a connection, the separator is configured to be fed with the air stream including vaporized raw water from the vaporizer through the connection, said separator configured to separate out at least in part the vaporized raw water present in the air stream, wherein the raw water treatment assembly is configured such that the raw water passes through the separator before entering the $CO_2$ heat pump;
wherein the $CO_2$ heat pump is configured to be supplied with heat on the cooling side via the raw water that has not been vaporized into the air stream; and
wherein the $CO_2$ heat pump, in a coldest subregion of the cooling side, has a thermal coupling which is configured to provide cooling for external applications.

2. The raw water treatment assembly as claimed in claim 1, wherein a fan is connected to the separator which separates out the vaporized raw water present in the air stream, wherein the fan is suitable for compressing the air stream.

3. The raw water treatment assembly as claimed in claim 1, wherein the separator, which separates out the vaporized raw water present in the air stream, comprises a carrier assembly having a number of carriers.

4. The raw water treatment assembly as claimed in claim 3, wherein the number of carriers are porously knitted flexible plastic tubings that have been subjected to a heat treatment for mechanical stabilization.

5. The raw water treatment assembly as claimed in claim 3, wherein the number of carriers are porous flexible tubings having an interior and a corresponding surface area in the interior of the tubings.

6. The raw water treatment assembly as claimed in claim 3, wherein the number of carriers are open-pore plates.

7. The raw water treatment assembly as claimed in claim 1, wherein the separator, which separates out the vaporized raw water present in the air stream, is cooled by incoming raw water before the heating thereof.

8. The raw water treatment assembly as claimed in claim 1, wherein the $CO_2$ heat pump is thermally coupled to the separator which separates out the vaporized raw water present in the air stream.

9. The raw water treatment assembly as claimed in claim 1, wherein the raw water treatment assembly additionally comprises a solar and/or geothermal device that heats the raw water further.

10. The raw water treatment assembly as claimed in claim 1, wherein the raw water treatment assembly additionally comprises a solar and/or geothermal device that is thermally coupled to the cooling side of the $CO_2$ heat pump.

11. A raw water treatment method comprising the steps:
heating the raw water;
partial vaporizing of the raw water into an air stream within a vaporizer, wherein the raw water is heated before entering the vaporizer; and
at least partial separating out of the raw water vaporized into the air stream,
wherein a $CO_2$ heat pump has a heating side, a cooling side, a compressor, a throttle and the raw water is heated by the heating side of the $CO_2$ heat pump, and wherein a cooling medium of the $CO_2$ heat pump comprises $CO_2$ refrigerant;
wherein the raw water passes through a separator before entering the $CO_2$ heat pump;
wherein the $CO_2$ heat pump is supplied with heat on the cooling side by the raw water that is not vaporized into the air stream; and
wherein the $CO_2$ heat pump has a thermal coupling in a coldest subregion of the cooling side to provide cooling for external applications.

12. The raw water treatment method as claimed in claim 11 that additionally comprises the following step:
compressing the air stream before separating out the raw water vaporized into the air stream.

13. The raw water treatment method as claimed in claim 11, wherein the heated raw water is vaporized into the air stream up to saturation of said air stream.

14. The raw water treatment assembly as claimed in claim 5, wherein the porous flexible tubings are made of artificial fibers or metal.

15. The raw water treatment assembly as claimed in claim 6, wherein the open-pore plates contain artificial fibers, rock wool or glass wool.

16. The raw water treatment assembly as claimed in claim 2, wherein the separator, which separates out the vaporized raw water present in the air stream, comprises a carrier assembly having a number of carriers.

17. The raw water treatment assembly as claimed in claim 2, wherein the separator, which separates out the vaporized raw water present in the air stream, is cooled by the incoming raw water before the heating thereof.

18. The raw water treatment assembly as claimed in claim 2, wherein the $CO_2$ heat pump is thermally coupled to the separator which separates out the vaporized raw water present in the air stream.

19. The raw water treatment assembly as claimed in claim 2, wherein the raw water treatment assembly additionally comprises a solar and/or geothermal device that heats the raw water further.

20. The raw water treatment method as claimed in claim 12, wherein the heated raw water is vaporized into the air stream up to saturation of said air stream.

* * * * *